United States Patent [19]
Combest et al.

[11] 3,890,232
[45] June 17, 1975

[54] FLUID FILTER

[75] Inventors: John F. Combest, Findlay, Ohio;
Rupert B. Bell, Detroit, Mich.

[73] Assignee: R. L. Kuss & Co., Inc., Findlay, Ohio

[22] Filed: Mar. 26, 1973

[21] Appl. No.: 345,191

[52] U.S. Cl. .......................................... 210/223
[51] Int. Cl. ........................................ B01d 35/06
[58] Field of Search .......... 210/223, 222, 446, 447, 210/232

[56] References Cited
UNITED STATES PATENTS

| | | | |
|---|---|---|---|
| 2,678,728 | 5/1954 | Spodig | 210/223 |
| 2,980,257 | 4/1961 | Paton | 210/223 |
| 3,211,291 | 10/1965 | Teutsch | 210/223 |
| 3,317,043 | 5/1967 | Vanderpoel | 210/232 X |
| 3,480,145 | 11/1969 | Gladden | 210/223 |
| 3,598,237 | 8/1971 | Aspinwall | 210/223 |

Primary Examiner—Theodore A. Granger
Attorney, Agent, or Firm—Vincent L. Barker, Jr.; Thomas M. Freiburger, Owen & Owen Co.

[57] ABSTRACT

The invention is an in-line fluid filter. The filter employs a ring-like magnet which intercepts magnetic particles from the flowing fluid and an integrally molded nylon unit which disperses the fuel in its movement toward a nylon mesh filter, insures the unrestricted flow of the fluid between the magnet and the mesh, and at the same time provides a mechanism to firmly hold the magnet in place at the inlet end of the filter's casing.

1 Claim, 6 Drawing Figures

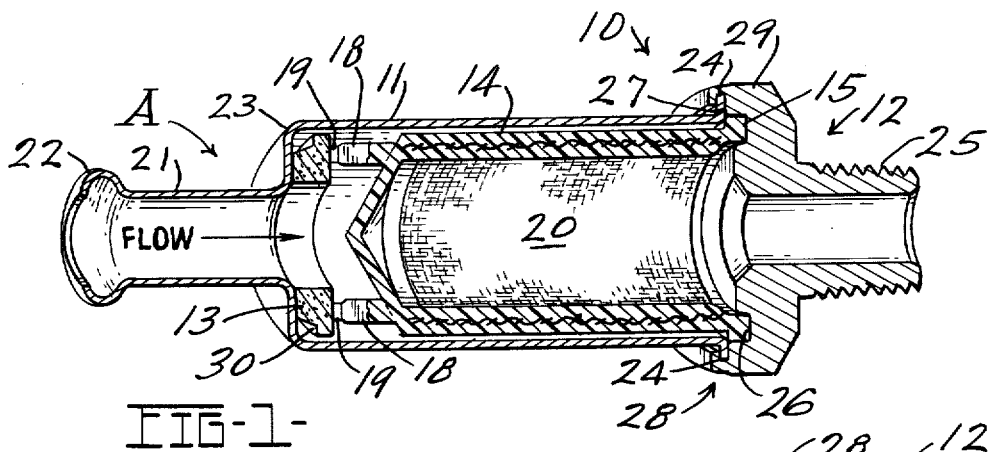
FIG-1-
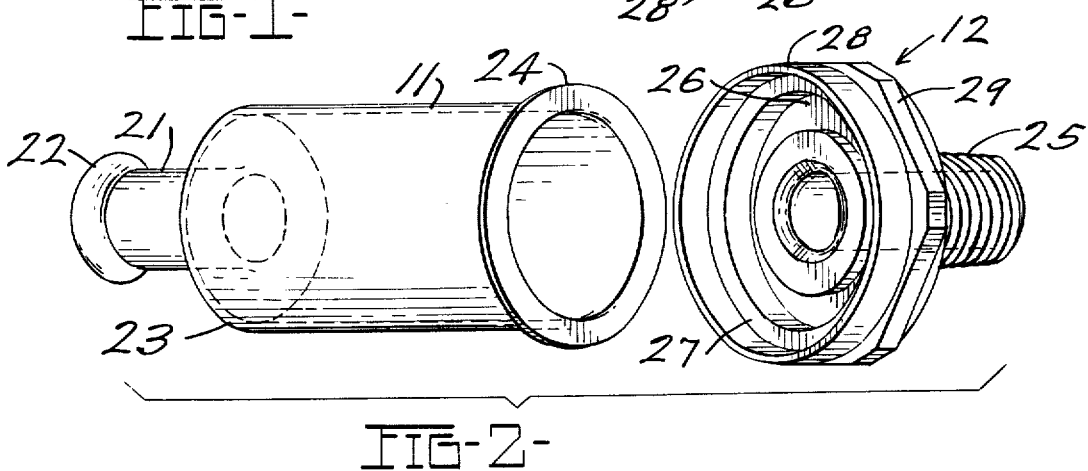
FIG-2-
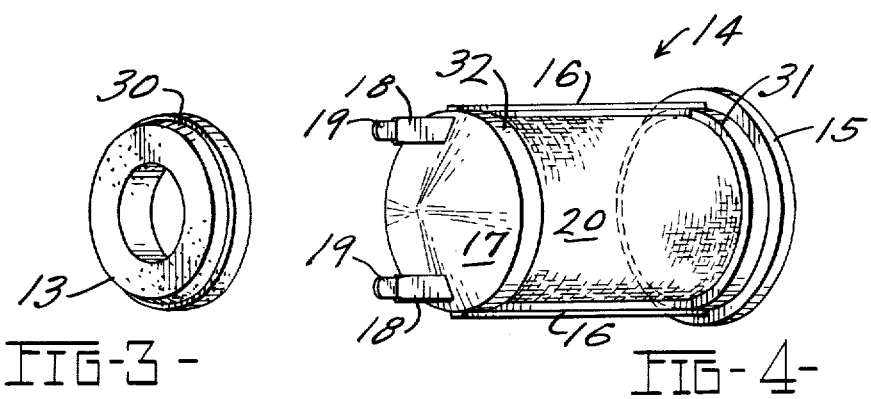
FIG-3-
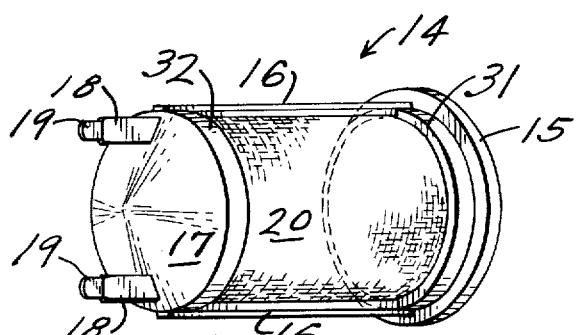
FIG-4-
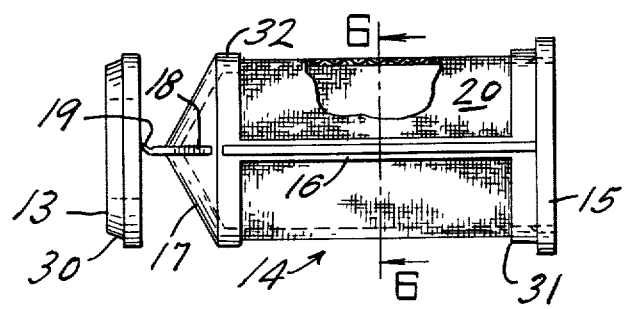
FIG-5-
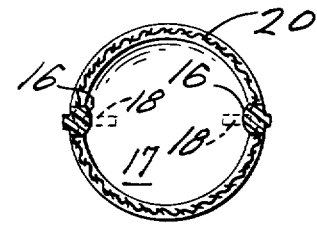
FIG-6-

FLUID FILTER

BACKGROUND OF THE INVENTION

Filters for automotive fuel systems are generally provided with a fine mesh screen for removing foreign particles from fuel prior to its introduction into a carburetor.

Automobile carburetors are often provided with an entrance valve comprising a metallic needle and seat. Repeated opening and closing of the entrance valve effects a slight magnetization of the needle and seat. Consequently, magnetic particles often present in the fuel are attracted to the entrance valve assembly, resulting in a jamming of the valve and improper function of the carburetor. The present invention provides an in-line filter having a first magnetic filter and a second nylon mesh filter. The present filter tends to prevent this jamming of the carburetor entrance valve and other difficulties caused by the introduction of foreign matter into the carburetor.

Filters having magnetic elements have previously been used for filtering magnetic particles from the gasoline supplied to internal combustion engines. However, many prior art magnetic fuel filters have included a settling bowl which must be oriented in a predetermined way upon the fuel pump or carburetor. The instant invention provides an in-line magnetic filter which can be positioned anywhere in an automobile fuel line between the fuel pump and the carburetor and which can be oriented either vertically, horizontally, or obliquely.

The instant filter does not rely solely on an adhesive to retain its ring-like magnet in position. Through vibration, an adhered joint would possibly break down and the consequent unrestricted vibration of the magnet would lead to deterioration of the magnet and reduced particle-catching efficiency. This undesirable result is avoided by the provision of an integrally molded nylon body with resiliently pivotal tabs which extend outwardly to engage the magnet and hold it in position. The nylon body includes a nylon filter mesh and a deflecting nose positioned downstream of the ring-like magnet. The nose deflects and evenly distributes fuel to the filter mesh. The even distribution minimizes pressure loss by distributing filtered particles over a large portion of the mesh area.

SUMMARY OF THE INVENTION

The present invention relates to an improved in-line fluid filter.

The filter has an outer case, preferably of cylindrical shape, with suitable inlet and outlet fittings. The fittings are connected in, for example, a fuel line of an automobile. Inside the case at the inlet end is a ring-like magnet through which fluid passes on its way into the body of the case and which filters out magnetic particles that might be contained in the fluid.

In the body of the case, contacting both the outlet end of the case and the magnet, is an integrally molded nylon body. The body has several functions. It provides a frame for cylindrically retaining a nylon mesh which acts as a second filter; it defines a gasket flange at one end for preventing fluid from reaching the filter outlet by any path other than through the mesh; it defines a conically shaped nose upstream of the mesh for deflecting fluid radially outwardly after it passes through the magnet; and it includes prong-like dividers extending upstream from the perimeter of the nose with molded tabs on their upstream ends for engaging the magnet and holding it tightly in place against the upstream end of the body of the case. The dividers also maintain a separation between the conically shaped nose and the ring-like magnet, so that the flow from the magnet to the mesh is not restricted.

This integrally molded nylon structure, together with the ring-like magnet, greatly simplifies the manufacture of an effective in-line fuel filter and provides a filter that will better withstand vibration and have a longer effective life.

BRIEF DESCRIPTION OF THE DRAWINGS

FIG. 1 is a sectional perspective view showing an assembled fluid filter embodying the instant invention;

FIG. 2 is an exploded view of a casing and an outlet end for the fluid filter, showing the outlet end disassembled from the casing;

FIG. 3 is a perspective view of a ring-like magnet embodying a filtering means of the instant invention;

FIG. 4 is a perspective view of an integrally molded nylon body;

FIG. 5 is a side view of the nylon body and magnet, showing the nylon structure engaging the magnet in approximately their assembled configuration; and FIG. 6 is a cross-sectional view of the nylon body taken along the line 6—6 of FIG. 5.

DESCRIPTION OF THE PREFERRED EMBODIMENT

A fluid filter according to the present invention is generally indicated in FIG. 1 by the reference number 10. The filter 10 includes a tubular or cylindrical casing 11. The casing 11 is generally metallic and has an outlet end 12. The filter 10 also includes a ring-like magnet 13 and an integrally-molded nylon body 14. The nylon body 14 includes a gasket ring 15, longitudinal structural supports 16, a conically shaped nose portion 17, and outwardly extending prong-like dividers 18. Flexible tabs 19 are mounted on the outermost ends of the dividers 18 and a nylon mesh 20 serves as the peripheral wall of the body 14.

Referring to FIGS. 1 and 2, in the present embodiment the casing 11 is of stamped metal, cylindrical in shape, and has an inlet fitting 21 also of generally cylindrical shape. The casing 11 and the fitting 21 are manufactured in one piece. At the upstream end of the inlet fitting 21 is an enlarged end portion 22, enabling the fitting to be connected to a flexible line of a fluid transmission system, such as an automobile fuel line. A shoulder portion 23 of the casing 11 is slightly rounded for increased strength. The downstream end of the casing 11 is formed into a flared rim 24 for intimate connection with the casing's outlet end 12.

Referring again to FIG. 2, the outlet end 12 of the filter 10 is a metal structure having a threaded outlet fitting 25 for connection into a portion of a fluid transmission system, such as an automobile carburetor. The outlet end 12 has a recessed portion 26 adapted to fit tightly over the gasket ring 15 of the nylon body 14. A raised rim 27 is provided for effecting sealed contact with the flared rim 24 of the casing 11. Exterior to the raised rim 27 is an outer rim 28 which upon assembly is crimped tightly over the flared rim 24 of casing 11 as shown in FIG. 1. An outer surface 29 of the outlet end 12 is hexagonal so that conventional tools can be used to tighten the assembled fluid filter into a fluid transmission system.

Referring now to FIG. 3, the ring-like magnet 13 is preferably of a ceramic material, and has a bevel or chamfer 30 adjacent the outer rim of its upstream side to enable it to fit flatly into the upstream end A of the casing 11 (See FIG. 1). The outer diameter of the magnet 13 is such that the magnet fits snugly into the casing 11.

As illustrated in FIGS. 4 and 5, the integrally molded nylon body 14 cylindrically retains the nylon mesh 20 of predetermined opeining size. Preferably the mesh 20 is capture molded to a base 31 of the gasket ring 15; to the two longitudinal structural supports 16; and to the base 32 of the conically-shaped nose portion 17. To direct fluid through the mesh 20 without leakage around the gasket ring 15, the gasket ring 15 fits snugly into the recessed portion 26 of the outlet end 12.

The longitudinal structural supports 16 are integrally molded to the base 31 of the gasket ring 15 and to a base 32 of the conically shaped nose portion 17, thus defining a rigid frame structure. Integrally molded to the nose portion 17 are the two flat outwardly-extending prong-like dividers 18. In the assembled filter 10, the tabs 19 at the ends of the prong-like dividers 18 engage and compressibly retain in place the ring-like magnet 13, as shown in FIG. 5. At the same time, the tabs 19 also compressibly retain the nylon body 14 tightly in place in the outlet end 12. The flat prong-like dividers 18 are positioned near the outer perimeter of nose portion 17 and are oriented in one plane so that fluid passing over nose portion 17 is subjected to a minimum flow restriction resulting from the dividers 18.

The flow of fluid through the assembled filter 10 is illustrated in FIG. 1. From a fluid supply, for example, from a fuel line downstream of a fuel pump, fluid enters the inlet fitting 21 of the casing 11 of the filter 10, loses any magnetic particles it may be carrying as it passes through the ring-like magnet filter 13, and is deflected and dispersed radially outwardly as it flows over the conically shaped nose portion 17. The dividers 18 space the nylon body 14 from the magnet 13 so that fluid flow is not restricted. After passing around the perimeter of the nose portion 17, the fluid passes through the nylon filtering mesh 20, through the open gasket ring 15, and into the threaded outlet fitting 25, from which it enters the fuel line or carburetor virtually devoid of foreign particles.

It will be seen that the above described preferred embodiment provides an in-line filter capable of removing unwanted particles by both magnetic and filter screen separation, is rugged and vibration resistant, and is economical to manufacture. Various other embodiments and changes to the preferred embodiment described above will be apparent to those skilled in the art and may be made without departing from the spirit and scope of the following claims.

We claim:

1. A fluid filter comprising an elongate case including a pair of opposed fittings providing fluid openings therethrough, a ring-like magnetic filter adjacent one of said fittings for capturing foreign magnetic particles within the fluid, said magnetic filter including an opening therethrough positioned in the path of the flowing fluid within the case, a filtering mesh adjacent said magnetic filter for capturing remaining foreign particles within the fluid, a conically shaped deflector member between said magnetic filter and said mesh and spaced from said magnetic filtering means for deflecting fluid from an axial path radially outwardly toward said mesh, and axially extending dividers connected to said deflecting means and said mesh, said dividers including resiliently pivotal tabs for compressibly engaging said magnetic filter and providing an unrestricted flow of the fluid from said magnetic filter over said deflector member.

* * * * *